(12) United States Patent
Nguyen et al.

(10) Patent No.: US 7,073,581 B2
(45) Date of Patent: Jul. 11, 2006

(54) ELECTROCONDUCTIVE PROPPANT COMPOSITIONS AND RELATED METHODS

(75) Inventors: Philip D. Nguyen, Duncan, OK (US); Dwight D. Fulton, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 254 days.

(21) Appl. No.: 10/868,608

(22) Filed: Jun. 15, 2004

(65) Prior Publication Data

US 2005/0274510 A1    Dec. 15, 2005

(51) Int. Cl.
*E21B 47/00*    (2006.01)

(52) U.S. Cl. .............................. 166/250.12; 166/280.1; 166/280.2

(58) Field of Classification Search ........... 166/250.12, 166/280.1, 280.2
See application file for complete search history.

(56) References Cited

U.S. PATENT DOCUMENTS

| | | | |
|---|---|---|---|
| 2,238,671 A | 4/1941 | Woodhouse ............... 166/21 |
| 2,703,316 A | 3/1955 | Schneider ................ 260/78.3 |
| 3,047,067 A | 7/1962 | Williams et al. ............ 166/33 |
| 3,123,138 A | 3/1964 | Robichaux .................. 166/33 |
| 3,176,768 A | 4/1965 | Brandt et al. ............... 166/33 |
| 3,199,590 A | 8/1965 | Young ......................... 166/33 |
| 3,272,650 A | 9/1966 | MacVittie .................... 134/7 |
| 3,297,086 A | 1/1967 | Spain .......................... 166/33 |
| 3,308,885 A | 3/1967 | Sandiford .................... 166/33 |
| 3,316,965 A | 5/1967 | Watanabe .................... 166/33 |
| 3,375,872 A | 4/1968 | McLaughlin et al. ........ 166/29 |
| 3,404,735 A | 10/1968 | Young et al. ................. 166/33 |
| 3,415,320 A | 12/1968 | Young .......................... 166/33 |
| 3,492,147 A | 1/1970 | Young et al. ............. 117/62.2 |
| 3,659,651 A | 5/1972 | Graham ...................... 166/280 |
| 3,681,287 A | 8/1972 | Brown et al. ................ 260/67 |
| 3,754,598 A | 8/1973 | Holloway, Jr. ............. 166/249 |
| 3,765,804 A | 10/1973 | Brandon ..................... 417/540 |
| 3,768,564 A | 10/1973 | Knox et al. ................. 166/307 |

(Continued)

FOREIGN PATENT DOCUMENTS

CA        2063877        5/2003

(Continued)

OTHER PUBLICATIONS

S. W. Almond, et al., "*Factors Affecting Proppant Flowback With Resin Coated Proppants*," Society of Petroleum Engineers, Inc., SPE 30096, p. 171-186, 1995.

(Continued)

*Primary Examiner*—Frank Tsay
(74) *Attorney, Agent, or Firm*—Robert A. Kent; Baker Botts

(57) ABSTRACT

Some embodiments provide methods of obtaining data from a portion of a subterranean formation comprising providing proppant particulates wherein at least a portion of the proppant particulates are coated with an electroconductive resin that comprises a resin and a conductive material; placing the proppant particulates into a portion of a fracture so as to form an electroconductive proppant pack; providing a transmitter capable of sending an electric current into the electroconductive proppant pack; sending an electric current into the electroconductive proppant pack with the transmitter; providing a receiver capable of deflecting a reflected or conducted electric signal from the electroconductive proppant pack; and, receiving a reflected electric signal with the receiver. Other embodiments provide electroconductive proppant packs comprising proppant particulates wherein a portion of the proppant particulates are coated with an electroconductive resin and wherein the electroconductive resin comprises a resin and a conductive material.

25 Claims, 4 Drawing Sheets

Idealized depiction of possible proppant banding created by injection of multiple types of electroconductive proppant, allowing determination of distribution of conductivity within the fracture

U.S. PATENT DOCUMENTS

| | | | |
|---|---|---|---|
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,842,911 A | 10/1974 | Know et al. | 166/307 |
| 3,854,533 A | 12/1974 | Gurley et al. | 166/276 |
| 3,857,444 A | 12/1974 | Copeland | 166/276 |
| 3,863,709 A | 2/1975 | Fitch | 165/1 |
| 3,868,998 A | 3/1975 | Lybarger et al. | 166/278 |
| 3,888,311 A | 6/1975 | Cooke, Jr. | 166/280 |
| 3,912,692 A | 10/1975 | Casey et al. | 260/78.3 |
| 3,948,672 A | 4/1976 | Harnberger | 106/90 |
| 3,955,993 A | 5/1976 | Curtice | 106/90 |
| 3,960,736 A | 6/1976 | Free et al. | 252/8.55 R |
| 4,008,763 A | 2/1977 | Lowe et al. | 166/253 |
| 4,031,958 A | 6/1977 | Sandiford et al. | 166/270 |
| 4,042,032 A | 8/1977 | Anderson et al. | 166/276 |
| 4,070,865 A | 1/1978 | McLaughlin | 61/36 |
| 4,074,760 A | 2/1978 | Copeland et al. | 166/276 |
| 4,127,173 A | 11/1978 | Watkins et al. | 166/276 |
| 4,169,798 A | 10/1979 | DeMartino | 252/8.55 R |
| 4,245,702 A | 1/1981 | Haafkens et al. | 166/307 |
| 4,273,187 A | 6/1981 | Satter et al. | 166/250 |
| 4,291,766 A | 9/1981 | Davies et al. | 166/276 |
| 4,305,463 A | 12/1981 | Zakiewicz | 106/245 |
| 4,336,842 A | 6/1982 | Graham et al. | 166/276 |
| 4,352,674 A | 10/1982 | Fery | 23/230 |
| 4,353,806 A | 10/1982 | Canter et al. | 507/229 |
| 4,387,769 A | 6/1983 | Erbstoesser et al. | 166/295 |
| 4,415,805 A | 11/1983 | Fertl et al. | 250/260 |
| 4,439,489 A | 3/1984 | Johnson et al. | 428/404 |
| 4,443,347 A | 4/1984 | Underdown et al. | 252/8.55 R |
| 4,460,052 A | 7/1984 | Gockel | 175/72 |
| 4,470,915 A | 9/1984 | Conway | 252/8.55 R |
| 4,493,875 A | 1/1985 | Beck et al. | 428/403 |
| 4,494,605 A | 1/1985 | Wiechel et al. | 166/288 |
| 4,498,995 A | 2/1985 | Gockel | 252/8.5 LC |
| 4,501,328 A | 2/1985 | Nichols | 166/288 |
| 4,526,695 A | 7/1985 | Erbstosser et al. | 252/8.55 R |
| 4,527,627 A | 7/1985 | Graham et al. | 166/280 |
| 4,541,489 A | 9/1985 | Wu | 166/312 |
| 4,546,012 A | 10/1985 | Brooks | 427/213 |
| 4,553,596 A | 11/1985 | Graham et al. | 166/295 |
| 4,564,459 A | 1/1986 | Underdown et al. | 252/8.55 R |
| 4,572,803 A | 2/1986 | Yamazoe et al. | 534/16 |
| 4,649,998 A | 3/1987 | Friedman | 166/294 |
| 4,664,819 A | 5/1987 | Glaze et al. | 252/8.551 |
| 4,665,988 A | 5/1987 | Murphey et al. | 166/295 |
| 4,669,543 A | 6/1987 | Young | 166/276 |
| 4,675,140 A | 6/1987 | Sparks et al. | 264/4.3 |
| 4,683,954 A | 8/1987 | Walker et al. | 166/307 |
| 4,694,905 A | 9/1987 | Armbruster | 166/280 |
| 4,715,967 A | 12/1987 | Bellis | 252/8.551 |
| 4,733,729 A | 3/1988 | Copeland | 166/276 |
| 4,739,832 A | 4/1988 | Jennings, Jr. et al. | 166/299 |
| 4,785,884 A | 11/1988 | Armbruster | 166/280 |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/278 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/295 |
| 4,829,100 A | 5/1989 | Murphey et al. | 523/131 |
| 4,838,352 A | 6/1989 | Oberste-Padtberg et al. | 166/291 |
| 4,842,072 A | 6/1989 | Friedman et al. | 166/295 |
| 4,843,118 A | 6/1989 | Lai et al. | 524/555 |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,886,354 A | 12/1989 | Welch et al. | 356/70 |
| 4,888,240 A | 12/1989 | Graham et al. | 428/403 |
| 4,895,207 A | 1/1990 | Friedman et al. | 166/276 |
| 4,903,770 A | 2/1990 | Friedman et al. | 166/288 |
| 4,934,456 A | 6/1990 | Moradi-Araghi | 166/270 |
| 4,936,385 A | 6/1990 | Weaver et al. | 166/288 |
| 4,942,186 A | 7/1990 | Murphey et al. | 523/131 |
| 4,957,165 A | 9/1990 | Cantu et al. | 166/295 |
| 4,959,432 A | 9/1990 | Fan et al. | 526/287 |
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,082,056 A | 1/1992 | Tackett, Jr. | 166/295 |
| 5,107,928 A | 4/1992 | Hilterhaus | 166/293 |
| 5,128,390 A | 7/1992 | Murphey et al. | 523/130 |
| 5,135,051 A | 8/1992 | Fracteau et al. | 166/104 |
| 5,142,023 A | 8/1992 | Gruber et al. | 528/354 |
| 5,165,438 A | 11/1992 | Fracteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,199,491 A | 4/1993 | Kutts et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Caabai et al. | 521/63 |
| 5,232,961 A | 8/1993 | Murphey et al. | 523/414 |
| 5,238,068 A | 8/1993 | Fredickson | 166/307 |
| 5,247,059 A | 9/1993 | Gruber et al. | 528/354 |
| 5,249,628 A | 10/1993 | Surjaatmadja | 166/305 |
| 5,256,729 A | 10/1993 | Kutts et al. | 524/700 |
| 5,273,115 A | 12/1993 | Spafford | 166/281 |
| 5,285,849 A | 2/1994 | Surles et al. | 166/295 |
| 5,293,939 A | 3/1994 | Surles et al. | 166/295 |
| 5,295,542 A | 3/1994 | Cole et al. | 166/278 |
| 5,320,171 A | 6/1994 | Laramay | 166/285 |
| 5,321,062 A | 6/1994 | Landrum et al. | 523/141 |
| 5,325,923 A | 7/1994 | Surjaatmadja et al. | 166/308 |
| 5,330,005 A | 7/1994 | Card et al. | 166/280 |
| 5,332,037 A | 7/1994 | Schmidt et al. | 166/276 |
| 5,335,726 A | 8/1994 | Rodrogues | 166/295 |
| 5,351,754 A | 10/1994 | Hardin et al. | 166/249 |
| 5,358,051 A | 10/1994 | Rodrigues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmajda et al. | 175/67 |
| 5,381,864 A | 1/1995 | Nguyen et al. | 166/280 |
| 5,386,874 A | 2/1995 | Laramay et al. | 166/300 |
| 5,388,648 A | 2/1995 | Jordan, Jr. | 166/380 |
| 5,393,810 A | 2/1995 | Harris et al. | 524/56 |
| 5,396,957 A | 3/1995 | Surjaatmadja et al. | 166/308 |
| 5,402,846 A | 4/1995 | Jennings, Jr. et al. | 166/259 |
| 5,422,183 A | 6/1995 | Sinclair et al. | 428/403 |
| 5,423,381 A | 6/1995 | Surles et al. | 166/295 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/54 |
| 5,492,178 A | 2/1996 | Nguyen et al. | 166/276 |
| 5,494,103 A | 2/1996 | Surjaatmadja et al. | 166/222 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,275 A | 3/1996 | Card et al. | 166/280 |
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |

| Patent No. | | Date | Inventor | Class |
|---|---|---|---|---|
| 5,522,460 | A | 6/1996 | Shu | 166/295 |
| 5,529,123 | A | 6/1996 | Carpenter et al. | 166/293 |
| 5,531,274 | A | 7/1996 | Bienvenu, Jr. | 166/280 |
| 5,536,807 | A | 7/1996 | Gruber et al. | 528/354 |
| 5,545,824 | A | 8/1996 | Stengel et al. | 524/590 |
| 5,547,023 | A | 8/1996 | McDaniel et al. | 166/280 |
| 5,551,513 | A | 9/1996 | Suries et al. | 166/278 |
| 5,551,514 | A | 9/1996 | Nelson et al. | 166/280 |
| 5,582,249 | A | 12/1996 | Caveny et al. | 166/276 |
| 5,582,250 | A | 12/1996 | Constein | 166/280 |
| 5,588,488 | A | 12/1996 | Vijn et al. | 166/293 |
| 5,591,700 | A | 1/1997 | Harris et al. | 507/204 |
| 5,594,095 | A | 1/1997 | Gruber et al. | 528/354 |
| 5,595,245 | A | 1/1997 | Scott, III | 166/250.1 |
| 5,597,784 | A | 1/1997 | Sinclair et al. | |
| 5,604,184 | A | 2/1997 | Ellis et al. | 507/117 |
| 5,604,186 | A | 2/1997 | Hunt et al. | 507/204 |
| 5,609,207 | A | 3/1997 | Dewprashad et al. | 166/276 |
| 5,620,049 | A | 4/1997 | Gipson et al. | 166/248 |
| 5,639,806 | A | 6/1997 | Johnson et al. | 523/208 |
| 5,670,473 | A | 9/1997 | Scepanski | 510/445 |
| 5,697,440 | A | 12/1997 | Weaver et al. | 166/281 |
| 5,698,322 | A | 12/1997 | Tsai et al. | 428/373 |
| 5,712,314 | A | 1/1998 | Surles et al. | 521/41 |
| 5,732,364 | A | 3/1998 | Kalb et al. | 588/8 |
| 5,765,642 | A | 6/1998 | Surjaatmadja | 166/297 |
| 5,775,425 | A | 7/1998 | Weaver et al. | 166/276 |
| 5,782,300 | A | 7/1998 | James et al. | 166/278 |
| 5,783,822 | A | 7/1998 | Buchanan et al. | 250/259 |
| 5,787,986 | A | 8/1998 | Weaver et al. | 166/280 |
| 5,791,415 | A | 8/1998 | Nguyen et al. | 166/280 |
| 5,799,734 | A | 9/1998 | Norman et al. | 166/278 |
| 5,806,593 | A | 9/1998 | Suries | 166/270 |
| 5,830,987 | A | 11/1998 | Smith | 528/332 |
| 5,833,000 | A | 11/1998 | Weaver et al. | 166/276 |
| 5,833,361 | A | 11/1998 | Funk | 366/80 |
| 5,836,391 | A | 11/1998 | Jonasson et al. | 166/280 |
| 5,836,392 | A | 11/1998 | Urlwin-Smith | 166/295 |
| 5,837,656 | A | 11/1998 | Sinclair et al. | 507/220 |
| 5,837,785 | A | 11/1998 | Kinsho et al. | 525/527 |
| 5,839,510 | A | 11/1998 | Weaver et al. | 166/276 |
| 5,840,784 | A | 11/1998 | Funkhouser et al. | 523/130 |
| 5,849,401 | A | 12/1998 | El-Afandi et al. | 428/215 |
| 5,849,590 | A | 12/1998 | Anderson, II et al. | 436/27 |
| 5,853,048 | A | 12/1998 | Weaver et al. | 166/279 |
| 5,864,003 | A | 1/1999 | Qureshi et al. | 528/141 |
| 5,865,936 | A | 2/1999 | Edelman et al. | 156/310 |
| 5,871,049 | A | 2/1999 | Weaver et al. | 166/276 |
| 5,873,413 | A | 2/1999 | Chatterji et al. | 166/293 |
| 5,875,844 | A | 3/1999 | Chatterji et al. | 166/293 |
| 5,875,845 | A | 3/1999 | Chatterji et al. | 166/293 |
| 5,875,846 | A | 3/1999 | Chatterji et al. | 166/293 |
| 5,893,383 | A | 4/1999 | Fracteau | 137/14 |
| 5,893,416 | A | 4/1999 | Read | 166/304 |
| 5,908,073 | A | 6/1999 | Nguyen et al. | 166/276 |
| 5,911,282 | A | 6/1999 | Onan et al. | 175/72 |
| 5,916,933 | A | 6/1999 | Johnson et al. | 523/208 |
| 5,921,317 | A | 7/1999 | Dewprashad et al. | 166/208 |
| 5,924,488 | A | 7/1999 | Nguyen et al. | 166/280 |
| 5,929,437 | A | 7/1999 | Elliott et al. | 250/259 |
| 5,944,105 | A | 8/1999 | Nguyen | 166/278 |
| 5,945,387 | A | 8/1999 | Chatterji et al. | 507/224 |
| 5,948,734 | A | 9/1999 | Sinclair et al. | 507/219 |
| 5,957,204 | A | 9/1999 | Chatterji et al. | 166/295 |
| 5,960,877 | A | 10/1999 | Funkhouser et al. | 166/270 |
| 5,960,880 | A | 10/1999 | Nguyen et al. | 166/280 |
| 5,964,291 | A | 10/1999 | Bourne et al. | 166/279 |
| 5,969,006 | A | 10/1999 | Onan et al. | 523/166 |
| 5,977,283 | A | 11/1999 | Rossitto | 528/44 |
| 5,994,785 | A | 11/1999 | Higuchi et al. | 527/789 |
| RE36,466 | E | 12/1999 | Nelson et al. | 166/280 |
| 6,003,600 | A | 12/1999 | Nguyen et al. | 166/281 |
| 6,004,400 | A | 12/1999 | Bishop et al. | 134/2 |
| 6,006,835 | A | 12/1999 | Onan et al. | 166/295 |
| 6,006,836 | A | 12/1999 | Chatterji et al. | 166/295 |
| 6,012,524 | A | 1/2000 | Chatterji et al. | 166/295 |
| 6,016,870 | A | 1/2000 | Dewprashad et al. | 166/295 |
| 6,024,170 | A | 2/2000 | McCabe et al. | 166/300 |
| 6,028,113 | A | 2/2000 | Scepanski | 514/643 |
| 6,028,534 | A | 2/2000 | Ciglenec et al. | 340/856.2 |
| 6,040,398 | A | 3/2000 | Kinsho et al. | 525/527 |
| 6,047,772 | A | 4/2000 | Weaver et al. | 166/276 |
| 6,059,034 | A | 5/2000 | Rickards et al. | 166/280 |
| 6,059,035 | A | 5/2000 | Chatterji et al. | 166/293 |
| 6,059,036 | A | 5/2000 | Chatterji et al. | 166/294 |
| 6,068,055 | A | 5/2000 | Chatterji et al. | 166/293 |
| 6,069,117 | A | 5/2000 | Onan et al. | 507/202 |
| 6,074,739 | A | 6/2000 | Katagiri | 428/323 |
| 6,079,492 | A | 6/2000 | Hoogteijling et al. | 166/276 |
| 6,098,711 | A | 8/2000 | Chatterji et al. | 166/294 |
| 6,114,410 | A | 9/2000 | Betzold | 523/130 |
| 6,123,871 | A | 9/2000 | Carroll | 252/301.36 |
| 6,123,965 | A | 9/2000 | Jacon et al. | 424/489 |
| 6,124,246 | A | 9/2000 | Heathman et al. | 507/219 |
| 6,130,286 | A | 10/2000 | Thomas et al. | 524/507 |
| 6,135,987 | A | 10/2000 | Tsai et al. | 604/365 |
| 6,140,446 | A | 10/2000 | Fujiki et al. | 528/15 |
| 6,148,911 | A | 11/2000 | Gipson et al. | 166/248 |
| 6,152,234 | A | 11/2000 | Newhouse et al. | 166/403 |
| 6,162,766 | A | 12/2000 | Muir et al. | 507/267 |
| 6,169,058 | B1 | 1/2001 | Le et al. | 507/222 |
| 6,172,011 | B1 | 1/2001 | Card et al. | 507/204 |
| 6,172,077 | B1 | 1/2001 | Curtis et al. | 514/278 |
| 6,176,315 | B1 | 1/2001 | Reddy et al. | 166/295 |
| 6,177,484 | B1 | 1/2001 | Surles | 523/131 |
| 6,184,311 | B1 | 2/2001 | O'Keefe et al. | 525/438 |
| 6,187,834 | B1 | 2/2001 | Thayer et al. | 522/15 |
| 6,187,839 | B1 | 2/2001 | Eoff et al. | 523/130 |
| 6,189,615 | B1 | 2/2001 | Sydansk | 166/270 |
| 6,192,985 | B1 | 2/2001 | Hinkel et al. | 166/280 |
| 6,192,986 | B1 | 2/2001 | Urlwin-Smith | 166/295 |
| 6,196,317 | B1 | 3/2001 | Hardy | 166/295 |
| 6,202,751 | B1 | 3/2001 | Chatterji et al. | 166/276 |
| 6,209,643 | B1 | 4/2001 | Nguyen et al. | 166/276 |
| 6,209,644 | B1 | 4/2001 | Brunet | 166/297 |
| 6,210,471 | B1 | 4/2001 | Craig | 106/31.08 |
| 6,214,773 | B1 | 4/2001 | Harris et al. | 507/271 |
| 6,231,644 | B1 | 5/2001 | Jain et al. | 106/724 |
| 6,234,251 | B1 | 5/2001 | Chatterji et al. | 166/295 |
| 6,238,597 | B1 | 5/2001 | Yim et al. | 252/512 |
| 6,241,019 | B1 | 6/2001 | Davidson et al. | 166/249 |
| 6,242,390 | B1 | 6/2001 | Mitchell et al. | 507/211 |
| 6,244,344 | B1 | 6/2001 | Chatterji et al. | 166/295 |
| 6,257,335 | B1 | 7/2001 | Nguyen et al. | 166/280 |
| 6,260,622 | B1 | 7/2001 | Blok et al. | 166/305.1 |
| 6,271,181 | B1 | 8/2001 | Chatterji et al. | 507/219 |
| 6,274,650 | B1 | 8/2001 | Cui | 523/457 |
| 6,279,652 | B1 | 8/2001 | Chatterji et al. | 166/194 |
| 6,279,656 | B1 | 8/2001 | Sinclair et al. | 166/310 |
| 6,283,214 | B1 | 9/2001 | Guinot et al. | 166/297 |
| 6,302,207 | B1 | 10/2001 | Nguyen et al. | 166/276 |
| 6,306,998 | B1 | 10/2001 | Kimura et al. | 528/12 |
| 6,311,773 | B1 | 11/2001 | Todd et al. | 166/280 |
| 6,321,841 | B1 | 11/2001 | Eoff et al. | 166/291 |
| 6,323,307 | B1 | 11/2001 | Bigg et al. | 528/354 |
| 6,326,458 | B1 | 12/2001 | Gruber et al. | 528/354 |
| 6,328,105 | B1 | 12/2001 | Betzold | 166/280 |
| 6,328,106 | B1 | 12/2001 | Griffith et al. | 166/295 |
| 6,330,916 | B1 | 12/2001 | Rickards et al. | 166/280 |
| 6,330,917 | B1 | 12/2001 | Chatterji et al. | 166/295 |
| 6,350,309 | B1 | 2/2002 | Chatterji et al. | 106/677 |
| 6,357,527 | B1 | 3/2002 | Norman et al. | 166/300 |
| 6,364,018 | B1 | 4/2002 | Brannon et al. | 166/280.2 |
| 6,364,945 | B1 | 4/2002 | Chatterji et al. | 106/677 |
| 6,367,165 | B1 | 4/2002 | Huttlin | 34/582 |
| 6,367,549 | B1 | 4/2002 | Chatterji et al. | 166/292 |

| Patent Number | Date | Inventor | Class |
|---|---|---|---|
| 6,372,678 B1 | 4/2002 | Youngsman et al. | 504/128 |
| 6,376,571 B1 | 4/2002 | Chawla et al. | 522/64 |
| 6,387,986 B1 | 5/2002 | Moradi-Araghi et al. | 523/211 |
| 6,390,195 B1 | 5/2002 | Nguyen et al. | 166/276 |
| 6,401,817 B1 | 6/2002 | Griffith et al. | 166/295 |
| 6,405,797 B1 | 6/2002 | Davidson et al. | 166/249 |
| 6,406,789 B1 | 6/2002 | McDaniel et al. | 428/403 |
| 6,408,943 B1 | 6/2002 | Schultz et al. | 166/285 |
| 6,422,314 B1 | 7/2002 | Todd et al. | 166/312 |
| 6,439,309 B1 | 8/2002 | Matherly et al. | 166/276 |
| 6,439,310 B1 | 8/2002 | Scott, III et al. | 166/308 |
| 6,440,255 B1 | 8/2002 | Kohlhammer et al. | 156/283 |
| 6,446,727 B1 | 9/2002 | Zemlak et al. | 166/308 |
| 6,448,206 B1 | 9/2002 | Griffith et al. | 507/219 |
| 6,450,260 B1 | 9/2002 | James et al. | 166/277 |
| 6,454,003 B1 | 9/2002 | Chang et al. | 166/270 |
| 6,458,885 B1 | 10/2002 | Stengal et al. | 524/507 |
| 6,485,947 B1 | 11/2002 | Rajgarhia et al. | 435/139 |
| 6,488,091 B1 | 12/2002 | Weaver et al. | 166/300 |
| 6,488,763 B1 | 12/2002 | Brothers et al. | 106/692 |
| 6,494,263 B1 | 12/2002 | Todd | 166/312 |
| 6,503,870 B1 | 1/2003 | Griffith et al. | 507/219 |
| 6,508,305 B1 | 1/2003 | Brannon et al. | 166/293 |
| 6,527,051 B1 | 3/2003 | Reddy et al. | 166/300 |
| 6,528,157 B1 | 3/2003 | Hussain et al. | 428/325 |
| 6,531,427 B1 | 3/2003 | Shuchart et al. | 507/267 |
| 6,538,576 B1 | 3/2003 | Schultz et al. | 340/859.6 |
| 6,543,545 B1 | 4/2003 | Chatterji et al. | 166/381 |
| 6,552,333 B1 | 4/2003 | Storm et al. | 250/269.3 |
| 6,554,071 B1 | 4/2003 | Reddy et al. | 166/293 |
| 6,555,507 B1 | 4/2003 | Chatterji et al. | 507/219 |
| 6,569,814 B1 | 5/2003 | Brady et al. | 507/201 |
| 6,582,819 B1 | 6/2003 | McDaniel et al. | 428/402 |
| 6,593,402 B1 | 7/2003 | Chatterji et al. | 524/7 |
| 6,599,863 B1 | 7/2003 | Palmer et al. | 507/219 |
| 6,608,162 B1 | 8/2003 | Chiu et al. | 528/129 |
| 6,616,320 B1 | 9/2003 | Huber et al. | 366/156.2 |
| 6,620,857 B1 | 9/2003 | Valet | 522/42 |
| 6,626,241 B1 | 9/2003 | Nguyen | 166/278 |
| 6,632,527 B1 | 10/2003 | McDaniel et al. | 428/402 |
| 6,632,892 B1 | 10/2003 | Rubinsztajn et al. | 525/476 |
| 6,642,309 B1 | 11/2003 | Komitsu et al. | 525/100 |
| 6,648,501 B1 | 11/2003 | Huber et al. | 366/301 |
| 6,659,179 B1 | 12/2003 | Nguyen | 166/227 |
| 6,664,343 B1 | 12/2003 | Narisawa et al. | 525/474 |
| 6,667,279 B1 | 12/2003 | Hessert et al. | 507/225 |
| 6,668,926 B1 | 12/2003 | Nguyen et al. | 166/280 |
| 6,669,771 B1 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,705,400 B1 | 3/2004 | Nugyen et al. | 166/276 |
| 6,710,019 B1 | 3/2004 | Sawdon et al. | 507/136 |
| 6,713,170 B1 | 3/2004 | Kaneka et al. | 428/323 |
| 6,725,926 B1 | 4/2004 | Nguyen et al. | 166/254.1 |
| 6,725,931 B1 | 4/2004 | Nguyen et al. | 166/280.2 |
| 6,729,404 B1 | 5/2004 | Nguyen et al. | 166/280.2 |
| 6,732,800 B1 | 5/2004 | Acock et al. | 166/308 |
| 6,745,159 B1 | 6/2004 | Todd et al. | 703/10 |
| 6,749,025 B1 | 6/2004 | Brannon et al. | 166/305.1 |
| 6,763,888 B1 | 7/2004 | Harris et al. | 166/305.1 |
| 6,766,858 B1 | 7/2004 | Nguyen et al. | 166/300 |
| 6,776,236 B1 | 8/2004 | Nguyen | 166/279 |
| 6,832,650 B1 | 12/2004 | Nguyen et al. | 166/279 |
| 6,851,474 B1 | 2/2005 | Nguyen | 166/279 |
| 6,887,834 B1 | 5/2005 | Nguyen et al. | 507/221 |
| 6,978,836 B1 | 12/2005 | Nguyen et al. | 166/295 |
| 2001/0016562 A1 | 8/2001 | Muir et al. | 507/201 |
| 2002/0043370 A1 | 4/2002 | Poe | 166/250.07 |
| 2002/0048676 A1 | 4/2002 | McDaniel et al. | 428/404 |
| 2002/0070020 A1 | 6/2002 | Nguyen | 166/295 |
| 2003/0006036 A1 | 1/2003 | Malone et al. | 166/250.12 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vollmer | 507/100 |
| 2003/0131999 A1 | 7/2003 | Nguyen et al. | 166/280 |
| 2003/0148893 A1 | 8/2003 | Lungofer et al. | 507/200 |
| 2003/0186820 A1 | 10/2003 | Thesing | 507/200 |
| 2003/0188766 A1 | 10/2003 | Banerjee et al. | 134/7 |
| 2003/0188872 A1 | 10/2003 | Nguyen et al. | 166/308 |
| 2003/0196805 A1 | 10/2003 | Boney et al. | 166/280 |
| 2003/0205376 A1 | 11/2003 | Ayoub et al. | 166/254.2 |
| 2003/0230408 A1 | 12/2003 | Acock et al. | 166/297 |
| 2003/0234103 A1 | 12/2003 | Lee et al. | 166/293 |
| 2004/0000402 A1 | 1/2004 | Nguyen et al. | 166/280 |
| 2004/0014607 A1 | 1/2004 | Sinclair et al. | 507/200 |
| 2004/0014608 A1 | 1/2004 | Nguyen et al. | 507/200 |
| 2004/0040706 A1 | 3/2004 | Hossaini et al. | 166/278 |
| 2004/0040708 A1 | 3/2004 | Stephenson et al. | 166/280.1 |
| 2004/0040713 A1 | 3/2004 | Nguyen et al. | 166/295 |
| 2004/0048752 A1 | 3/2004 | Nguyen et al. | 507/269 |
| 2004/0055747 A1 | 3/2004 | Lee | 166/278 |
| 2004/0106525 A1 | 6/2004 | Willbert et al. | 507/200 |
| 2004/0138068 A1 | 7/2004 | Rimmer et al. | 507/100 |
| 2004/0149441 A1 | 8/2004 | Nguyen et al. | 166/280.1 |
| 2004/0152601 A1 | 8/2004 | Still et al. | 507/100 |
| 2004/0177961 A1 | 9/2004 | Nguyen et al. | 166/280.2 |
| 2004/0194961 A1 | 10/2004 | Nguyen et al. | 166/295 |
| 2004/0206499 A1 | 10/2004 | Nguyen et al. | 166/280.2 |
| 2004/0211559 A1 | 10/2004 | Nguyen et al. | 166/276 |
| 2004/0211561 A1 | 10/2004 | Nguyen et al. | 166/280.2 |
| 2004/0221992 A1 | 11/2004 | Nguyen et al. | 166/295 |
| 2004/0231845 A1 | 11/2004 | Cooke, Jr. | 166/279 |
| 2004/0231847 A1 | 11/2004 | Nguyen et al. | 166/295 |
| 2004/0256099 A1 | 12/2004 | Nguyen et al. | 166/249 |
| 2004/0261995 A1 | 12/2004 | Nguyen et al. | 166/279 |
| 2004/0261997 A1 | 12/2004 | Nguyen et al. | 166/281 |
| 2005/0000731 A1 | 1/2005 | Nguyen et al. | 175/57 |
| 2005/0006093 A1 | 1/2005 | Nguyen et al. | 166/281 |
| 2005/0006095 A1 | 1/2005 | Justus et al. | 166/295 |
| 2005/0006096 A1 | 1/2005 | Nguyen et al. | 166/295 |
| 2005/0045326 A1 | 3/2005 | Nguyen | 166/278 |

FOREIGN PATENT DOCUMENTS

| | | |
|---|---|---|
| EP | 0313243 B1 | 10/1988 |
| EP | 0528595 A1 | 8/1992 |
| EP | 0510762 A2 | 11/1992 |
| EP | 0643196 A2 | 6/1994 |
| EP | 0834644 A2 | 4/1998 |
| EP | 0853186 A2 | 7/1998 |
| EP | 0864726 A2 | 9/1998 |
| EP | 0879935 B1 | 11/1998 |
| EP | 0933498 A1 | 8/1999 |
| EP | 1001133 A1 | 5/2000 |
| EP | 1132569 A2 | 9/2001 |
| EP | 1326003 A1 | 7/2003 |
| EP | 1362978 A1 | 11/2003 |
| EP | 1394355 A1 | 3/2004 |
| EP | 1396606 A2 | 3/2004 |
| EP | 1398640 A1 | 3/2004 |
| EP | 1403466 A2 | 3/2004 |
| EP | 1464789 A1 | 10/2004 |
| GB | 1292718 | 10/1972 |
| GB | 2382143 A | 4/2001 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 01/81914 | 11/2001 |
| WO | WO 01/87797 A1 | 11/2001 |
| WO | WO 02/12674 A1 | 2/2002 |
| WO | WO 03/027431 A1 | 4/2003 |
| WO | WO 04/037946 A1 | 5/2004 |

| | | |
|---|---|---|
| WO | WO 04/038176 A1 | 5/2004 |
| WO | WO 05/021928 A2 | 3/2005 |

OTHER PUBLICATIONS

Jessica Gorman, *Plastic Electric: Lining up the Future of Conducting Polymers*, Science News, vol. 163, May 17, 2003.
U.S. Appl. No. 10/383,154, filed Mar. 6, 2003, Nguyen et al.
U.S. Appl. No. 10/394,898, filed Mar. 21, 2003, Eoff et al.
U.S. Appl. No. 10/408,800, filed Apr. 7, 2003, Nguyen et al.
U.S. Appl. No. 10/601,407, filed Jun. 23, 2003, Byrd et al.
U.S. Appl. No. 10/603,492, filed Jun. 25, 2003, Nguyen et al.
U.S. Appl. No. 10/649,029, filed Aug. 27, 2003, Nguyen et al.
U.S. Appl. No. 10/650,063, filed Aug. 26, 2003, Nguyen.
U.S. Appl. No. 10/650,064, filed Aug. 26, 2003, Nguyen et al.
U.S. Appl. No. 10/650,065, filed Aug. 26, 2003, Nguyen.
U.S. Appl. No. 10/659,574, filed Sep. 10, 2003, Nguyen et al.
U.S. Appl. No. 10/727,365, filed Dec. 4, 2003, Reddy et al.
U.S. Appl. No. 10/751,593, filed Jan. 5, 2004, Nguyen.
U.S. Appl. No. 10/775,347, filed Feb. 10, 2004, Nguyen.
U.S. Appl. No. 10/791,944, filed Mar. 3, 2004, Nguyen.
U.S. Appl. No. 10/793,711, filed Mar. 5, 2004, Nguyen et al.
U.S. Appl. No. 10/852,811, filed May 25, 2004, Nguyen.
U.S. Appl. No. 10/853,879, filed May 26, 2004, Nguyen et al.
U.S. Appl. No. 10/860,951, filed Jun. 4, 2004, Stegent et al.
U.S. Appl. No. 10/861,829, filed Jun. 4, 2004, Stegent et al.
U.S. Appl. No. 10/862,986, filed Jun. 8, 2004, Nguyen et al.
U.S. Appl. No. 10/864,061, filed Jun. 9, 2004, Blauch et al.
U.S. Appl. No. 10/864,618, filed Jun. 9, 2004, Blauch et al.
U.S. Appl. No. 10/868,593, filed Jun. 15, 2004, Nguyen et al.
U.S. Appl. No. 10/868,608, filed Jun. 15, 2004, Nguyen et al.
U.S. Appl. No. 10/937,076, filed Sep. 9, 2004, Nguyen et al.
U.S. Appl. No. 10/944,973, filed Sep. 20, 2004, Nguyen et al.
U.S. Appl. No. 10/972,648, filed Oct. 25, 2004, Dusterhoft et al.
U.S. Appl. No. 10/977,673, filed Oct. 29, 2004, Nguyen.
U.S. Appl. No. 11/009,277, filed Dec. 8, 2004, Welton et al.
U.S. Appl. No. 11/011,394, filed Dec. 12, 2004, Nguyen et al.
U.S. Appl. No. 11/035,833, filed Jan. 14, 2005, Nguyen.
U.S. Appl. No. 11/049,252, filed Feb. 2, 2005, Van Batenburg et al.
U.S. Appl. No. 11/053,280, filed Feb. 8, 2005, Nguyen.
U.S. Appl. No. 11/056,635, filed Feb. 11, 2005, Dusterhoft et al.
Halliburton, *CoalStim$^{SM}$ Service, Helps Boost Cash Flow From CBM Assets*, Stimulation, HO3679 Oct. 2003, 2003, Halliburton Communications.
Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications.
Halliburton, *Expedite® Service, A Step-Change Improvement Over Conventional Proppant Flowback Control Systems. Provides Up to Three Times the Conductivity of RCPs.*, Stimulation, HO3296 May 2004, 2004, Halliburton Communications.
Halliburton Technical Flier—Multi Stage Frac Completion Methods, 2 pages.
Halliburton "*CobraFrac$^{SM}$ Service, Coiled Tubing Fracturing—Cost-Effective Method for Stimulating Untapped Reserves*", 2 pages, 2004.
Halliburton "*CobraJetFrac$^{SM}$ Service, Cost-Effective Technology That Can Help Reduce Cost per BOE Produced, Shorten Cycle time and Reduce Capex*".
Halliburton Cobra Frac Advertisement, 2001.
Halliburton "*SurgiFrac$^{SM}$ Service, a Quick and cost-Effective Method to Help Boost Production From Openhole Horizonal Completions*", 2002.
Halliburton, *SandWedge® NT Conductivity Enhancement System, Enhances Proppant Pack Conductivity and Helps Prevent Intrusion of Formation Material for Improved Long-Term Production*, Stimulation, HO2289 May 2004, 2004, Halliburton Communications.
Nguyen et al., *A Novel Approach For Enhancing Proppant Consolidation: Laboratory Testing And Field Applications*, SPE Paper No. 77748, 2002.
SPE 15547, *Field Application of Lignosulfonate Gels To Reduce Channeling*, South Swan Hills Miscible Unit, Alberta, Canada, by O.R. Wagner et al., 1986.
Owens et al., *Waterflood Pressure Pulsing for Fractured Reservoirs* SPE 1123, 1966.
Felsenthal et al., *Pressure Pulsing—An Improved Method of Waterflooding Fractured Reservoirs* SPE 1788, 1957.
Raza, "*Water and Gas Cyclic Pulsing Method for Improved Oil Recovery*", SPE 3005, 1971.
Peng et al., "*Pressure Pulsing Waterflooding in Dual Porosity Naturally Fractured Reservoirs*" SPE 17587, 1988.
Dusseault et al, "*Pressure Pulse Workovers in Heavy Oil*", SPE 79033, 2002.
Yang et al., "*Experimental Study on Fracture Initiation By Pressure Pulse*", SPE 63035, 2000.
Nguyen et al., *New Guidelines For Applying Curable Resin-Coated Proppants*, SPE Paper No. 39582, 1997.
Kazakov et al., "*Optimizing and Managing Coiled Tubing Frac Strings*" SPE 60747, 2000.
Advances in Polymer Science, vol. 157, "*Degradable Aliphatic Polyesters*" edited by A.-C. Alberston, 2001.
Gorman, *Plastic Electric: Lining up the Future of Conducting Polymers* Science News, vol. 163, May 17, 2003.
Gidley et al., "*Recent Advances in Hydraulic Fracturing*," Chapter 6, pp. 109-130, 1989.
Simmons et al., "*Poly(phenyllactide): Synthesis, Characterization, and Hydrolytic Degradation, Biomacromolecules*", vol. 2, No. 2, pp. 658-663, 2001.
Yin et al., "*Preparation and Characterization of Substituted Polyactides*", Americal Chemical Society, vol. 32, No. 23, pp. 7711-7718, 1999.
Yin et al., "*Synthesis and Properties of Polymers Derived from Substituted Lactic Acids*", American Chemical Society, Ch. 12, pp. 147-159, 2001.
Cantu et al., "*Laboratory and Field Evaluation of a Combined Fluid-Loss Control Additive and Gel Breaker for Fracturing Fluids*," SPE 18211, 1990.
Love et al., "*Selectively Placing Many Fractures in Openhole Horizontal Wells Improves Production*", SPE 50422, 1998.

McDaniel et al. "*Evolving New Stimulation Process Proves Highly Effective In Level 1 Dual-Lateral Completion*" SPE 78697, 2002.

Albertsson et al.,"*Aliphatic Polyesters: Synthesis, Properties and Applications*", Advances in Polymer Science, vol. 57 Degradable Aliphatic Polyesters, 2002.

Dechy-Cabaret et al., "*Controlled Ring-Operated Polymerization of Lactide and Glycolide*" American Chemical Society, Chemical Reviews, A-Z, AA-AD, 2004.

Funkhouser et al., "*Synthetic Polymer Fracturing Fluid For High-Temperature Applications*", SPE 80236, 2003.

*Chelating Agents*, Encyclopedia of Chemical Technology, vol. 5 (764-795).

Vichaibun et al., "*A New Assay for the Enzymatic Degradation of Polylactic Acid, Short Report*", ScienceAsia, vol. 29, pp. 297-300, 2003.

CDX Gas, CDX Solution, 2003, CDX, LLC, Available @ www.cdxgas.com/solution.html, printed pp. 1-2.

CDX Gas, "*What is Coalbed Methane?*" CDX, LLC. Available @ www.cdxgas.com/what.html, printed p. 1.

Halliburton brochure entitled "H2Zero™ Service Introducing The Next Generation of cost-Effective Conformance Control Solutions"., 2002.

Halliburton brochure entitled " "INJECTROL® A Component:, 1999.

Halliburton brochure entitled "INJECTROL® G Sealant", 1999.

Halliburton brochure entitled "INJECTROL® IT Sealant", 1999.

Halliburton brochure entitled "INJECTROL® Service Treatment", 1999.

Halliburton brochure entitled "INJECTROL® U Sealant", 1999.

Halliburton brochure entitled "Sanfix® A Resin", 1999.

Halliburton brochure entitled "Pillar Frac Stimulation Technique" Fracturing Services Technical Data Sheet, 2 pages.

Foreign search report and opinion (CPW 21582 EP), Mar. 11, 2005.

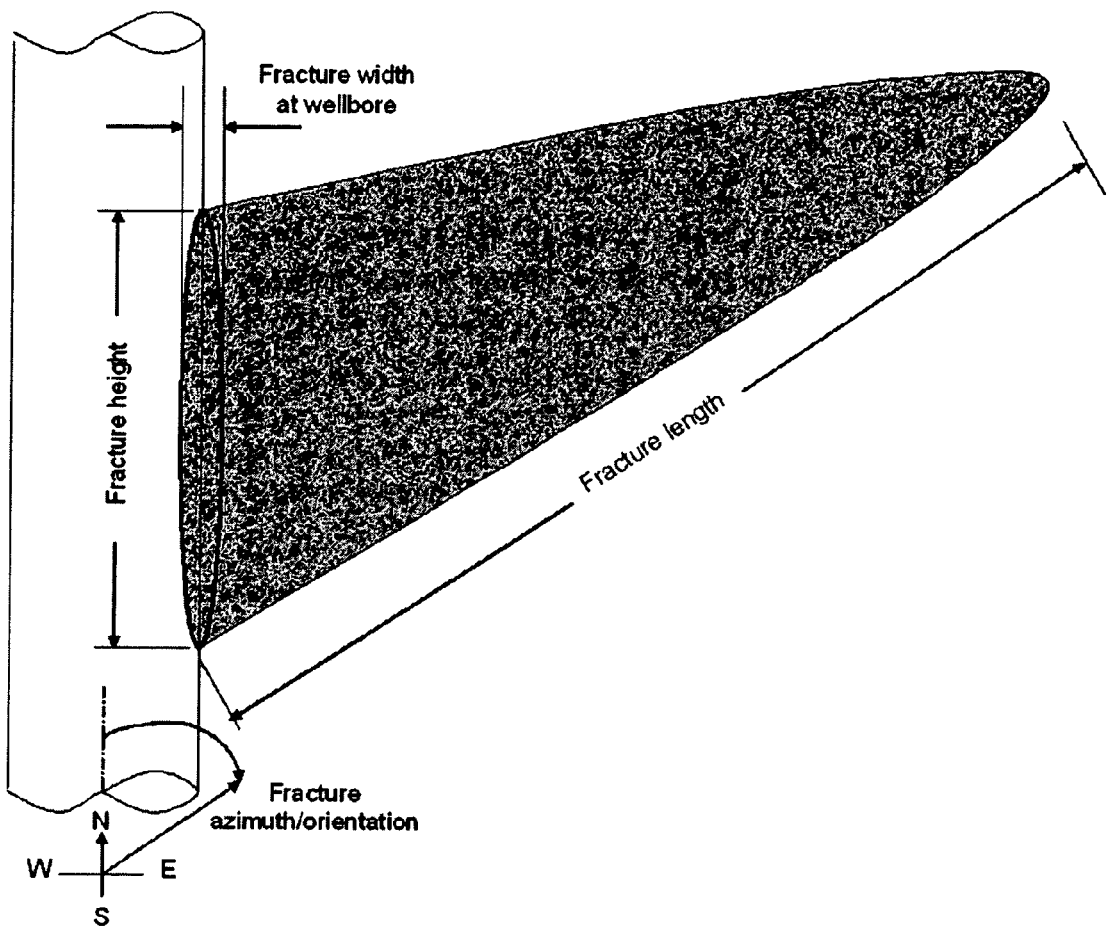
Figure 1 – Basic fracture geometry (as is standard in the energy industry, shown in this illustration is only one wing of the typical, bi-wing, symmetrical fracture)

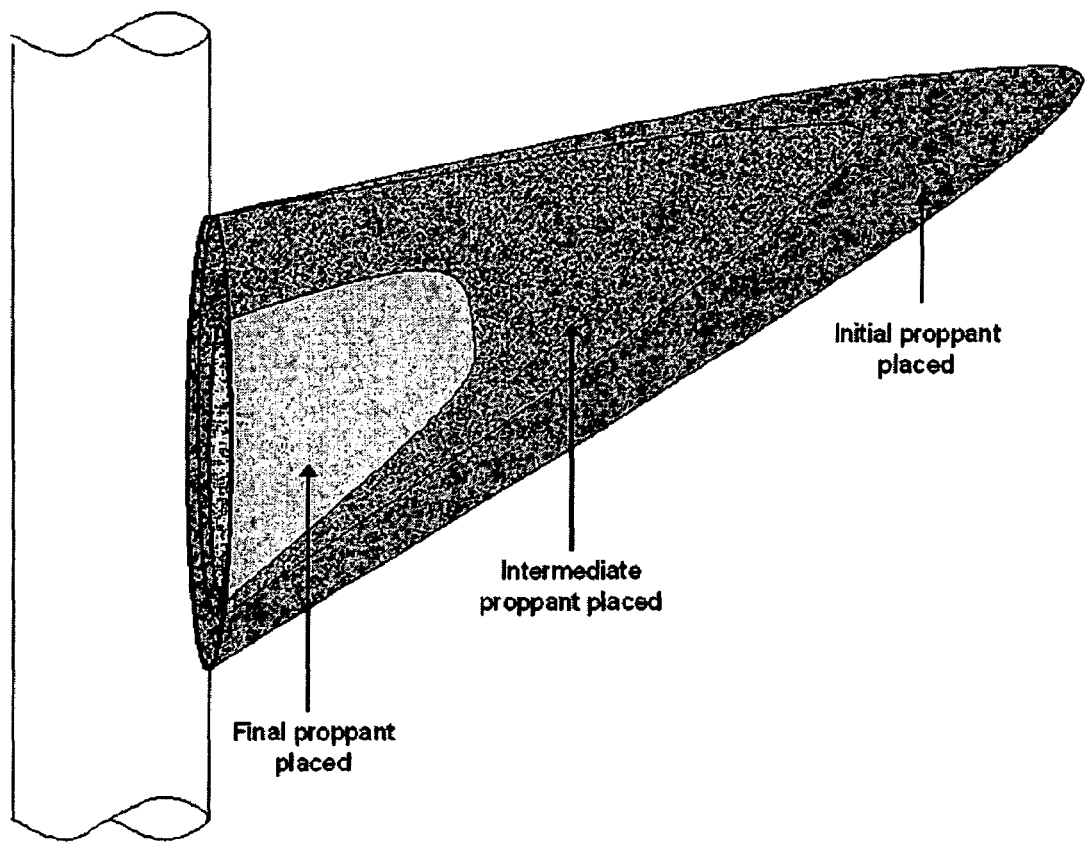
Figure 2 – Idealized depiction of possible proppant banding created by injection of multiple types of electroconductive proppant, allowing determination of distribution of conductivity within the fracture

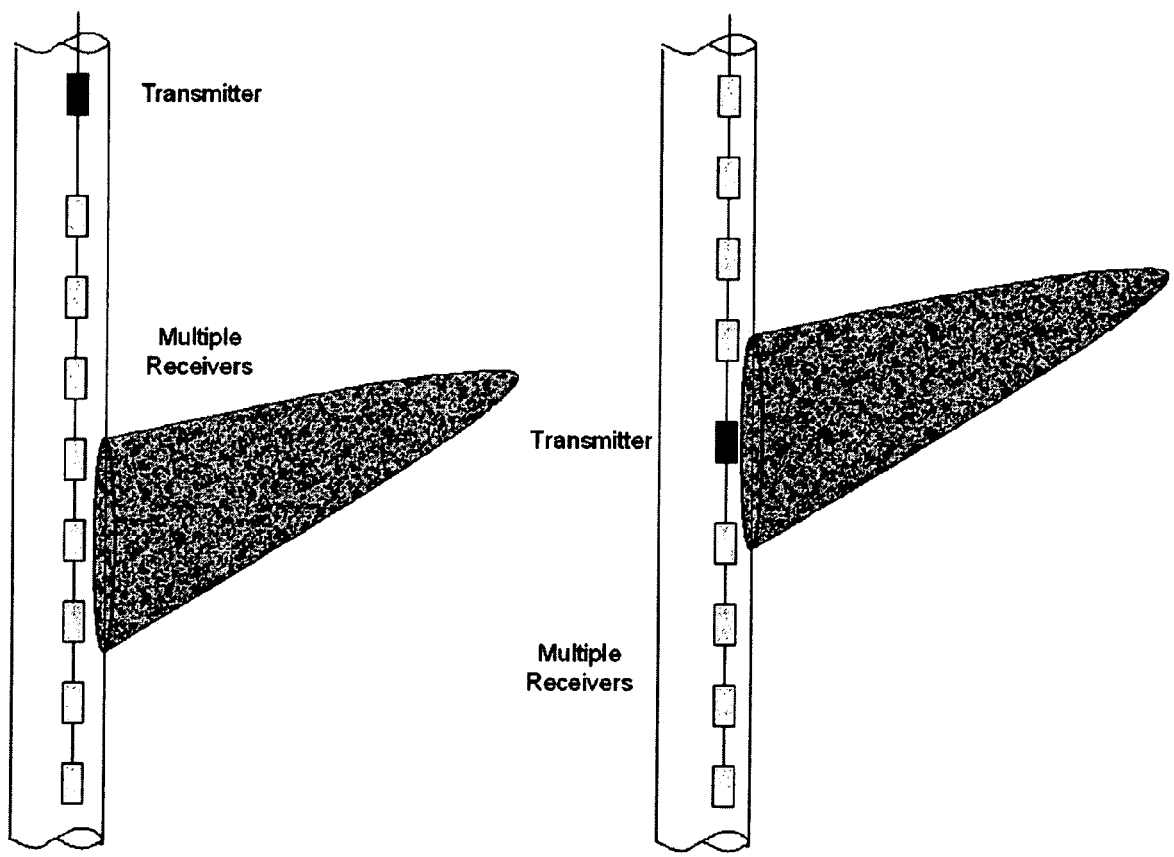
Figure 3 – Possible configurations of transmitter and multiple receivers when all are arrayed within the active well

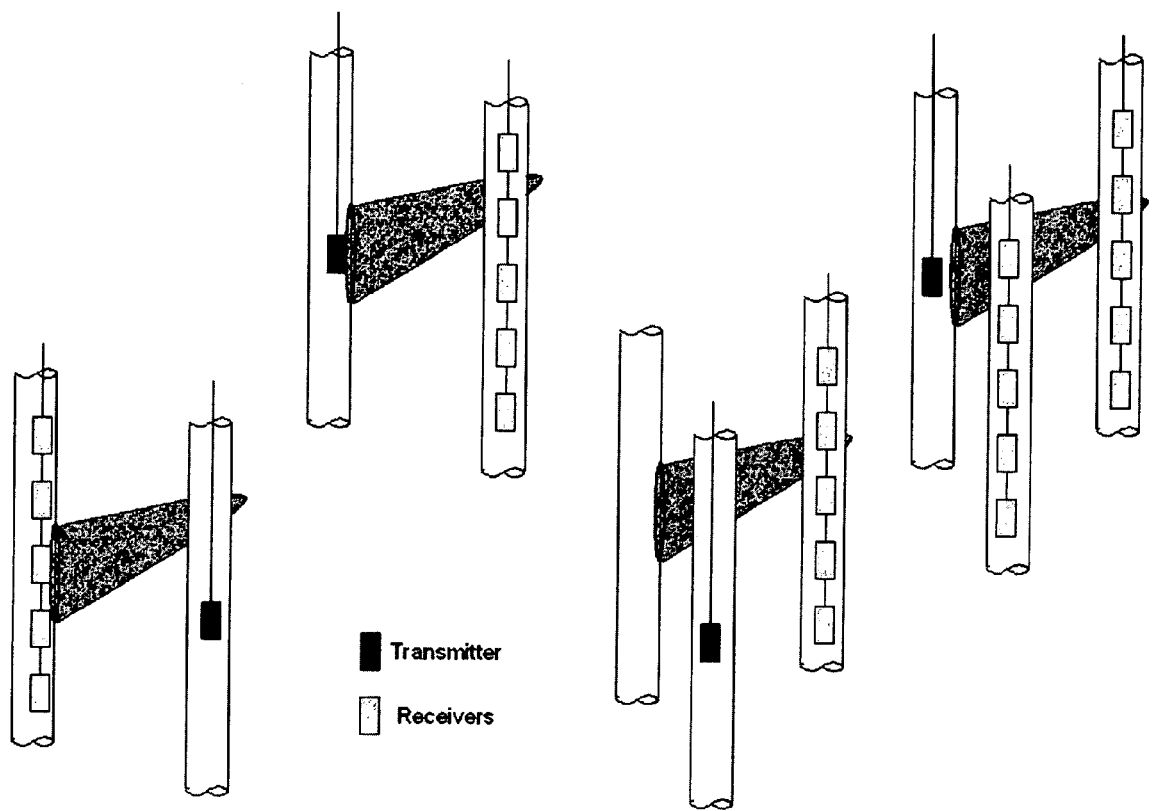
Figure 4 – Possible configurations of transmitter and multiple receivers when arrayed in one or more nearby observation wells

ELECTROCONDUCTIVE PROPPANT COMPOSITIONS AND RELATED METHODS

BACKGROUND

The present invention relates to electroconductive proppant compositions and methods of using electroconductive proppant compositions in subterranean formations to determine, among other things, proppant pack characteristics such as dimensions, orientation, and conductivity.

Hydraulic fracturing is a widely-used process for improving well productivity by placing or enhancing cracks or channels from a well bore a surrounding reservoir. This operation essentially is performed by injecting a fracturing fluid into a well bore penetrating a subterranean formation at a pressure sufficient to create a fracture in the formation or to enhance a natural fracture in the formation. Proppant particulates may be placed in the fracture to prevent the fracture from closing once the pressure is released. Upon placement, the proppant particulates usually form proppant packs in or near desired fractures. These proppant packs, thus, may maintain the integrity of those fractures to create conductive paths to the well bore for desirable fluids to flow. Placing an appropriate amount of proppant particulates to form a suitable proppant pack is thus important to the success of a hydraulic fracture treatment.

The geometry of a hydraulic fracture affects the efficiency of the process and the success of a fracturing operation. FIG. 1 illustrates basic fracture geometry. A fracture's geometry may be mapped from direct measurement of the fracture growth. This has been done, for instance, by placing tiltmeters in either the active well or in an observation well and monitoring rock deformation caused by the growing fracture. However, although tiltmeters and other direct methods (e.g., microseismic measurements) have been used to determine fracture geometry, historically, fracture geometry is more commonly estimated by interpreting measured data and applying mathematical models of fracture growth. This analysis has been generally limited to data from indirect measurements (e.g., flow rate, pressure, temperature, etc.) taken from the well bores during the fracture treatments. These measurements, however, are heavily influenced by well bore effects, such as fluid rheology, fluid density, and fluid friction in the well bore, and generally are not a reliable means of determining some fracture parameters. Fracture conditions, such as the integrity of the proppant pack over time and flow rates through various portions of the fracture pack, cannot be effectively monitored using these well bore measurements

SUMMARY OF THE INVENTION

The present invention relates to electroconductive proppant compositions and methods of using electroconductive proppant compositions in subterranean formations to determine, among other things, proppant pack characteristics such as dimensions, orientation, and conductivity.

Some embodiments of the present invention provide methods of obtaining data from a portion of a subterranean formation comprising providing proppant particulates wherein at least a portion of the proppant particulates are coated with an electroconductive resin that comprises a resin and a conductive material; placing the proppant particulates into a portion of a fracture so as to form an electroconductive proppant pack; providing a transmitter capable of sending an electric current into the electroconductive proppant pack; sending an electric current into the electroconductive proppant pack with the transmitter; providing a receiver capable of deflecting a reflected or conducted electric signal from the electroconductive proppant pack; and, receiving a reflected electric signal with the receiver.

Other embodiments of the present invention provide electroconductive proppant packs comprising proppant particulates wherein a portion of the proppant particulates are coated with an electroconductive resin and wherein the electroconductive resin comprises a resin and a conductive material.

Other and further features and advantages of the present invention will be readily apparent to those skilled in the art upon a reading of the description of preferred embodiments which follows.

BRIEF DESCRIPTION OF THE DRAWINGS

FIG. 1 illustrates an example of a basic fracture geometry.

FIG. 2 illustrates an exemplary stylized fracture wherein multiple regions of proppant particulates with distinct conductivity have been placed.

FIG. 3 illustrates two possible example configurations of embodiments wherein multiple receivers are placed in the well bore in the region of the subterranean fracture to determine the spatial distribution of electroconductive proppant particulates.

FIG. 4 illustrates four possible example configurations of a transmitter and an array of receivers in an active well and in an offset observation well.

DESCRIPTION OF PREFERRED EMBODIMENTS

The present invention relates to electroconductive proppant compositions and methods of using electroconductive proppant compositions in subterranean formations to determine, among other things, proppant pack characteristics such as dimensions, orientation, and conductivity. The present invention provides novel methods relating to obtaining information on the characteristics of a fracture and proppant pack using both direct and indirect measurements of the fracture growth, final fracture or proppant pack placement, proppant conductivity, and the level of clean up of the fracturing fluid. The methods of the present invention generally related to the use of proppant particulates coated with an electroconductive resin.

In certain embodiments, the improved methods and compositions of the present invention comprise using electroconductive proppant compositions to obtain data from a fracture within a subterranean formation penetrated by a well bore comprising the steps of: forming an electroconductive proppant pack in a subterranean fracture; placing one or more receivers capable of receiving an electric signal into the well bore proximate to the electroconductive proppant pack; contacting the electroconductive proppant pack with an electric charge; and, measuring the resistance of the conductive proppant pack via a receiver. The resistance measurements may be interpreted to provide information regarding, among other things, the proppant pack conductivity and the dimensions and geometry of the subterranean fracture and/or the proppant pack. The receiver also may be designed to sense one or more formation parameters, including, but not limited to, pressure, temperature, dielectric constant, rock strain, porosity, and flow rate. In certain preferred embodiments, data corresponding to the subterranean formation may be obtained during fracture treatment to monitor fracture growth during a treatment operation (e.g., data monitored in "real time").

The electroconductive proppant compositions of the present invention comprise proppant particulates coated with a curable electroconductive resin. In some embodiments of the present invention, only chosen portions of the proppant particulates making up the proppant pack are coated with electroconductive resins. In other embodiments, substantially all of the proppant particulates making up the proppant pack are coated with electroconductive resin. In some embodiments from about 20% to about 100% of the proppant particulates are coated with a curable electroconductive resin. In other embodiments from about 30% to about 90% of the proppant particulates are coated with a curable electroconductive resin. In other embodiments from about 50% to about 850% of the proppant particulates are coated with a curable electroconductive resin.

In certain preferred embodiments, the electroconductive proppant particulates may be placed in specific desired regions of the subterranean fracture. For example, electroconductive proppant particulates may be used during fracture treatment as only the first portion of proppant placed. Non-conductive proppant particulates or proppant particulates with a distinct conductivity as compared with the earlier placed proppant particulates may then be used during fracture treatment of a second or further portion of the subterranean formation. This method may be repeated to obtain multiple regions of distinctly conductive and/or non-conductive proppant particulates within the subterranean fracture. FIG. 2 illustrates a stylized fracture wherein multiple regions of proppant with distinct conductivity have been placed. By so placing the electroconductive proppant in specific regions of the subterranean fracture and using the methods and compositions according to the present invention detailed information about, inter alia, the proppant conductivity and the dimensions and geometry of the subterranean fracture and proppant pack may be obtained.

Suitable proppant particulates for use in the present invention include those materials often used as proppant particulates, such as nut shells, sand, ceramics, natural sand, quartz sand, particulate garnet, metal particulates, glass, nylon pellets, bauxite and other ores, polymeric materials, combinations, and the like. Suitable sizes range from 4 to 100 U.S. mesh; in certain preferred embodiments the sizes range from 10 to 70 U.S. mesh. In preferred embodiments, the particles themselves may be at least somewhat conductive (as in the case of bauxite-based particles) or very conductive (as in the case of copper-based particles).

In order, among other things, to encourage consolidation of the proppant pack and to tailor the electroconductivity of the proppant, the selected proppant particulates should be at least partially coated with a curable, electroconductive resin. Curable resins that are suitable for use in the present invention include, but are not limited to, two component epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present invention and to determine whether a catalyst is required for the desired curing characteristics.

While the chosen resin may itself be somewhat conductive, in certain embodiments, the resin may be mixed with a conductive material in an amount sufficient to obtain a desired degree of conductivity. Suitable conductive materials include, but are not limited to, powders that comprise conductive particulates, e.g., graphite, copper, iron, zinc, brass, tin, conductive plastics, conductive graphite materials, or combinations thereof. In one exemplary embodiment, the conductive resin may comprise an epoxy resin containing fine graphite powder. In another exemplary embodiment, the conductive resin may comprise a furan resin containing fine particulate copper. In certain exemplary embodiments, the conductive material has a particle distribution size of from about 0.1 µm to about 100 µm. In other exemplary embodiments, the conductive material has a particle distribution size of from about 15 µm to about 50 µm.

In certain preferred embodiments, the curable electroconductive resin bonds to adjoining particulates to form an aggregate of particulates that may form a proppant pack. The resin may be present in an amount sufficient to consolidate the proppant particulates but should not fill the pore spaces or openings between the particulates. The conductive resin may be coated on the proppant particulates in an amount from about 0.1% to about 6% by weight of the proppant particulates, preferably an amount from about 1% to about 3% by weight of the proppant particulates. In a preferred embodiment, the resin may bond the proppant particulates in a coarse aggregate to fix the particulates in the fracture and provide a flow path for produced fluids through the subterranean fracture.

Some methods of the present invention use transmitters to send an electrical signal into an electroconductive proppant pack and receivers to collect information from the electroconductive proppant pack. In a preferred embodiment, the signal comprises an electric current or an electromagnetic field. In certain preferred embodiments, the electric or electromagnetic signal from the transmitter is conducted along, and reflected back from the electroconductive proppant to the receiver and may be used to determine, inter alia, the dimensions and geometry of the subterranean fracture. For example, the strength, offset, and phase of the reflected signal may be used to determine, inter alia, height, width, length, and orientation of the subterranean fracture. In other preferred embodiments, an electric current can be used to determine the electric impedance within the electroconductive proppant. The measured impedance within the subterranean fracture may be used to quantitatively measure the proppant conductivity or the distribution of proppant conductivity through the subterranean fracture after placement of proppant.

In a preferred embodiment, at least one receiver is placed in the well bore of the subterranean formation. For example, a single receiver may be placed in the well bore at the fracture initiation point. In another example, multiple receivers may be placed in the well bore in the region of the subterranean fracture to determine the spatial distribution of electroconductive proppant in the subterranean fracture (e.g., to determine the fracture height and width). FIG. 3 illustrates two possible configurations. In a further example, a single receiver or multiple receivers may be placed in one or more observation wells to obtain data from a point of view outside of the active, or producing well bore. In addition, placing receivers in multiple observation wells may allow determination of the dimensions and orientation of the subterranean fracture, including but not limited to, the fracture length, height, and azimuth, by triangulation of the received data. FIG. 4 is an exemplary embodiment showing four possible configurations of a transmitter and an array of receivers in the active well and in an offset observation well, to determine, inter alia, the length, height and width of a hydraulic fracture, preferably in real-time.

Some embodiments of the present invention further include self-contained sensors placed in the proppant pack capable of collecting additional data about the proppant and providing the data to the receivers. In certain preferred embodiments, the sensors may be placed within the subterranean fracture during the fracturing treatment. Any sensors known to one skilled in the art may be used with the methods and compositions of the present invention. Examples of suitable sensors that may be used with the methods and compositions of the present invention have been described in U.S. Pat. No. 6,538,576, the relevant disclosure of which is incorporated herein by reference. The sensors may be used to obtain, inter alia, temperature, pressure, porosity, resistivity, magnetic field, and flow rate data. In certain exemplary embodiments, the electric current or electromagnetic field provided by the transmitter into the subterranean fracture may be used to provide power to one or more sensors. Various methods suitable for powering such devices are described, for example, in U.S. Pat. No. 6,408,943, the relevant disclosure of which is incorporated herein by reference.

While the invention has been depicted and described by reference to exemplary embodiments of the invention, such a reference does not imply a limitation on the invention, and no such limitation is to be inferred. The invention is capable of considerable modification, alteration, and equivalents in form and function, as will occur to those ordinarily skilled in the pertinent arts having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalence in all respects.

What is claimed is:

1. A method of obtaining data from a portion of a subterranean formation comprising:
    providing proppant particulates wherein at least a portion of the proppant particulates are coated with an electroconductive resin that comprises a resin and a conductive material;
    placing the proppant particulates into a portion of a fracture so as to form an electroconductive proppant pack;
    providing a transmitter capable of sending an electric current into the electroconductive proppant pack;
    sending an electric current into the electroconductive proppant pack with the transmitter;
    providing a receiver capable of deflecting a reflected or conducted electric signal from the electroconductive proppant pack; and,
    receiving a reflected electric signal with the receiver.

2. The method of claim 1 wherein the portion of the proppant particulates are coated with an electroconductive resin is from about 20% to about 100% of the total proppant particulates used.

3. The method of claim 1 wherein the proppant particulates are coated with an electroconductive resin comprises a first portion of particulates coated with a first electroconductive resin and a second portion of particulates coated with a second electroconductive resin and wherein the first electroconductive resin exhibits a distinct conductivity as compared to the second electroconductive resin.

4. The method of claim 1 wherein the proppant particulates comprise nut shells, sand, ceramics, natural sand, quartz sand, particulate garnet, metal particulates, glass, nylon pellets, bauxite and other ores, polymeric materials, and combinations thereof.

5. The method of claim 1 wherein the proppant particulates range in size from about 4 U.S. Mesh to about 100 U.S. Mesh.

6. The method of claim 1 wherein the proppant particulates are at least partially conductive.

7. The method of claim 1 wherein the resin in the electroconductive resin comprises an epoxy based resin, a novolak resin, a polyepoxide resin, a phenol-aldehyde resin, a urea-aldehyde resin, a urethane resin, a phenolic resin, a furan resin, a furan/furfuryl alcohol resin, a phenolic/latex resin, a phenol formaldehyde resin, a polyester resin, a hybrid polyester resin, a copolymer polyester resin, a polyurethane resin, hybrid polyurethane resin, a copolymer polyurethane resin, an acrylate resin, or a combination thereof.

8. The method of claim 1 wherein the conductive material in the electroconductive resin comprises a conductive metal material or a conductive plastic material.

9. The method of claim 8 wherein the metal powder comprises graphite powder, copper powder, iron powder, zinc powder, brass powder, tin powder, or combinations thereof.

10. The method of claim 8 wherein the conductive metal powder has a particle distribution size of from about 0.1 μm to about 100 μm.

11. The method of claim 8 wherein the conductive metal powder has a particle distribution size of from about 15 μm to about 50 μm.

12. The method of claim 1 wherein the proppant particulates coated with electroconductive resin comprise from about 0.1% to about 6% electroconductive resin by weight of the proppant particle.

13. The method of claim 1 wherein, while placing the proppant particulates into a portion of a fracture so as to form an electroconductive proppant pack, sensors are simultaneously placed so as to create an electroconductive proppant pack further comprising sensors.

14. An electroconductive proppant pack comprising proppant particulates wherein a portion of the proppant particulates are coated with an electroconductive resin and wherein the electroconductive resin comprises a resin and a conductive material.

15. The electroconductive proppant pack of claim 14 wherein the portion of the proppant particulates are coated with an electroconductive resin is from about 20% to about 100% of the total proppant particulates.

16. The electroconductive proppant pack of claim 14 wherein the proppant particulates coated with an electroconductive resin comprise a first portion of particulates coated with a first electroconductive resin and a second portion of particulates coated with a second electroconductive resin and wherein the first electroconductive resin exhibits a distinct conductivity as compared to the second electroconductive resin.

17. The electroconductive proppant pack of claim 14 wherein the proppant particulates comprise nut shells, sand, ceramics, natural sand, quartz sand, particulate garnet, metal particulates, glass, nylon pellets, bauxite and other ores, polymeric materials, and combinations thereof.

18. The electroconductive proppant pack of claim 14 wherein the proppant particulates range in size from about 4 U.S. Mesh to about 100 U.S. Mesh.

19. The electroconductive proppant pack of claim 14 wherein the proppant particulates are at least partially conductive.

20. The electroconductive proppant pack of claim 14 wherein the resin in the electroconductive resin comprises an epoxy based resin, a novolak resin, a polyepoxide resin, a phenol-aldehyde resin, a urea-aldehyde resin, a urethane resin, a phenolic resin, a furan resin, a furan/furfuryl alcohol resin, a phenolic/latex resin, a phenol formaldehyde resin, a polyester resin, a hybrid polyester resin, a copolymer polyester resin, a polyurethane resin, hybrid polyurethane resin, a copolymer polyurethane resin, an acrylate resin, or a combination thereof.

21. The electroconductive proppant pack of claim 14 wherein the conductive material in the electroconductive resin comprises a conductive metal material or a conductive plastic material.

22. The electroconductive proppant pack of claim 21 wherein the metal powder comprises graphite powder, copper powder, iron powder, zinc powder, brass powder, tin powder, or combinations thereof.

23. The electroconductive proppant pack of claim 21 wherein the conductive metal powder has a particle distribution size of from about 0.1 μm to about 100 μm.

24. The electroconductive proppant pack of claim 21 wherein the conductive metal powder has a particle distribution size of from about 15 μm to about 50 μm.

25. The electroconductive proppant pack of claim 14 wherein the proppant particulates coated with electroconductive resin comprise from about 0.1% to about 6% electroconductive resin by weight of the proppant particle.

* * * * *